United States Patent [19]

Rhodes et al.

[11] 4,205,662
[45] Jun. 3, 1980

[54] SOLAR PANEL ASSEMBLY

[75] Inventors: Richard O. Rhodes, San Francisco; Jonathan C. Backlund, Palo Alto, both of Calif.

[73] Assignee: Fafco, Inc., Menlo Park, Calif.

[21] Appl. No.: 5,966

[22] Filed: Jan. 24, 1979

[51] Int. Cl.² ............................ F24J 3/02; F28F 7/00; F28F 3/14
[52] U.S. Cl. ........................... 126/444; 126/446; 126/447; 126/448; 126/449; 165/81; 165/82; 165/170
[58] Field of Search ............... 126/270, 271, 444, 445, 126/446, 447, 448, 449; 237/1 A; 165/81, 82, 133, 170

[56] References Cited

U.S. PATENT DOCUMENTS

| | | | |
|---|---|---|---|
| 4,026,268 | 5/1977 | Bartos et al. | 126/270 |
| 4,062,350 | 12/1977 | Reed | 126/271 |
| 4,063,547 | 12/1977 | Gruettner | 237/1 A |
| 4,068,652 | 1/1978 | Worthington | 126/271 |
| 4,076,015 | 2/1978 | Mattson | 126/271 |
| 4,086,912 | 5/1978 | Freeman | 126/271 |
| 4,089,324 | 5/1978 | Tjaden | 165/170 |
| 4,125,108 | 11/1978 | Porter et al. | 126/271 |
| 4,128,095 | 12/1978 | Oren et al. | 126/271 |

*Primary Examiner*—James C. Yeung
*Assistant Examiner*—Daniel J. O'Connor
*Attorney, Agent, or Firm*—Flehr, Hohbach, Test, et al

[57] ABSTRACT

A solar panel assembly is disclosed herein and includes a solar panel arrangement having a main body which defines internal passageways, between inlet and outlet headers, a corrugated glazing sheet located on the top side of the panel body and at least one but preferably two corrugated support sheets located under the panel body. The assembly also includes a header cover on each end of the panel which, in part, encloses a corresponding one of the headers and which, in part, nests against the corrugated glazing sheet and one of the corrugated support sheets.

15 Claims, 10 Drawing Figures

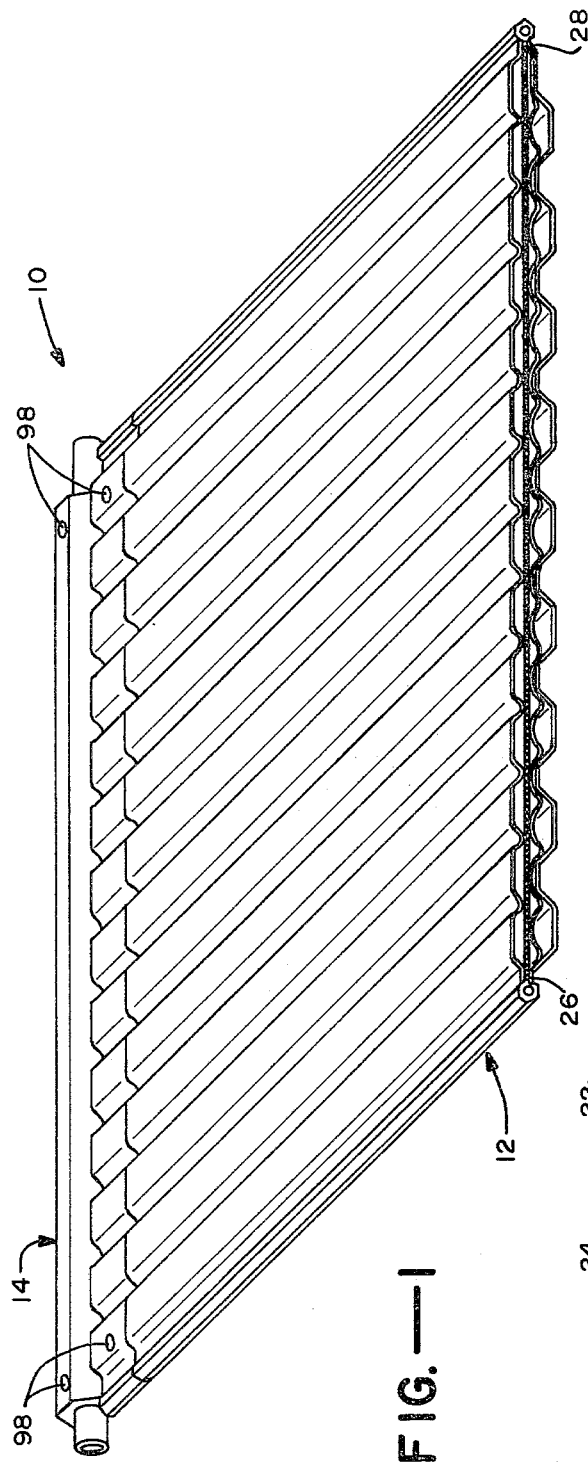
FIG.—1
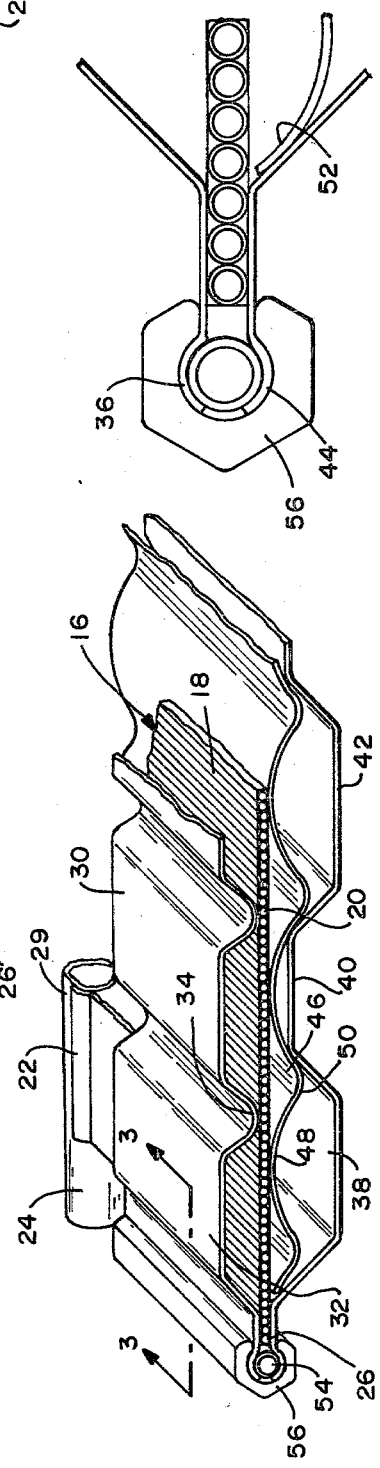
FIG.—2
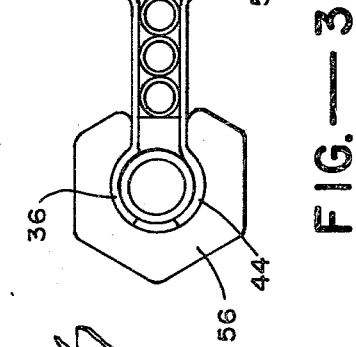
FIG.—3

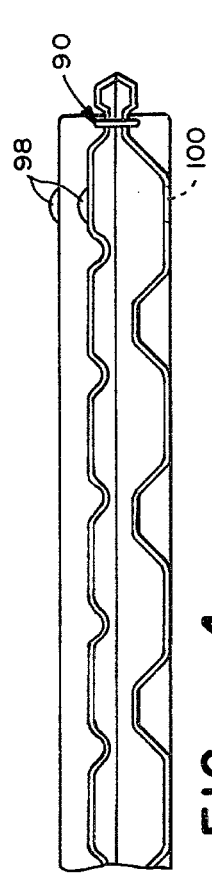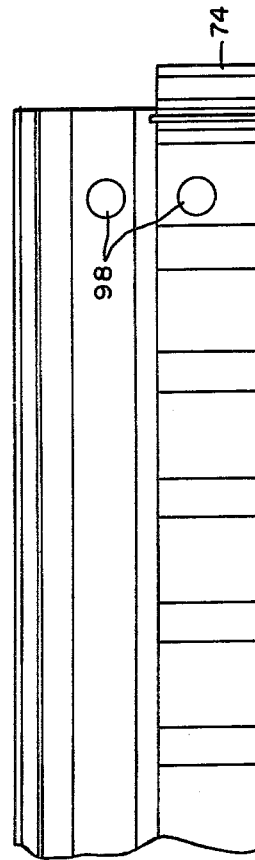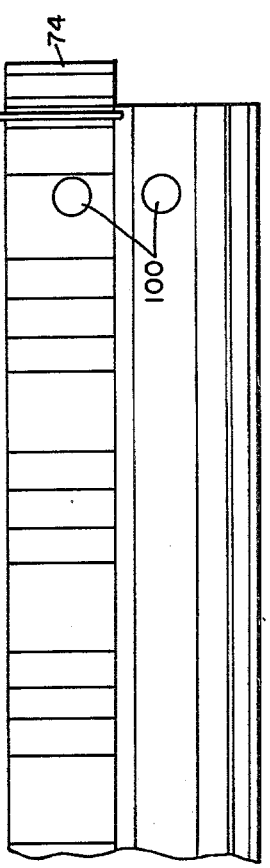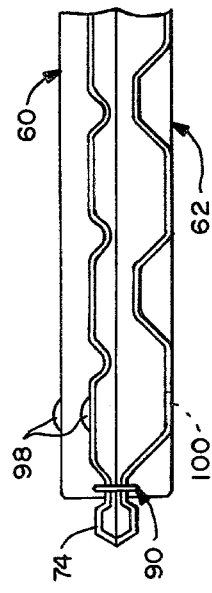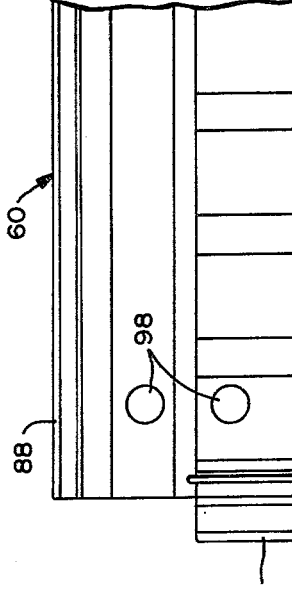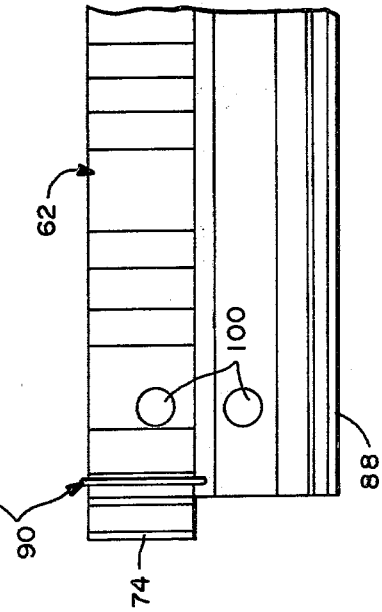

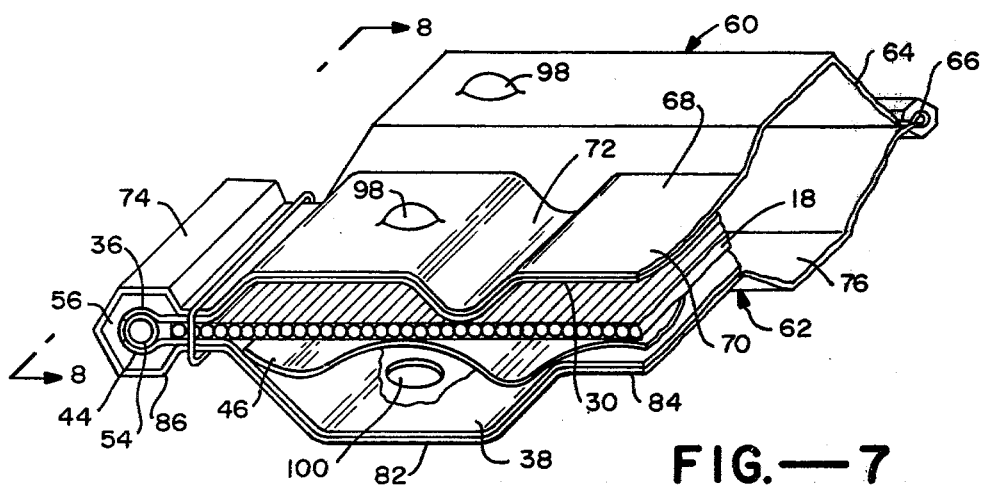
FIG.—7
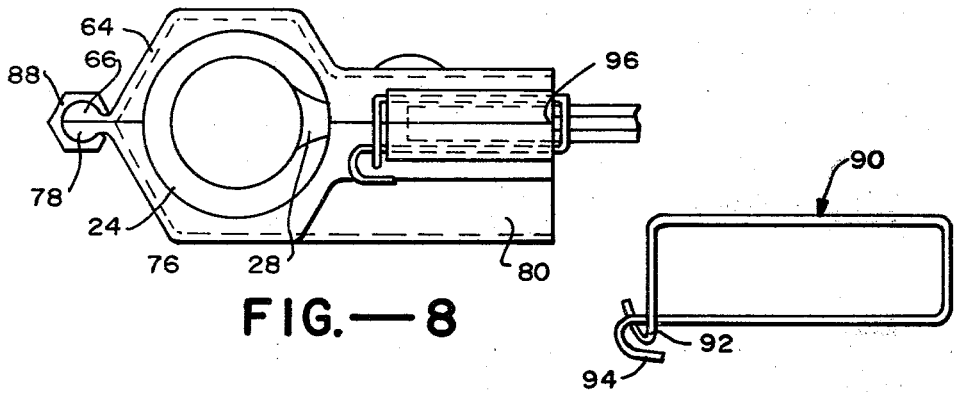
FIG.—8
FIG.—9
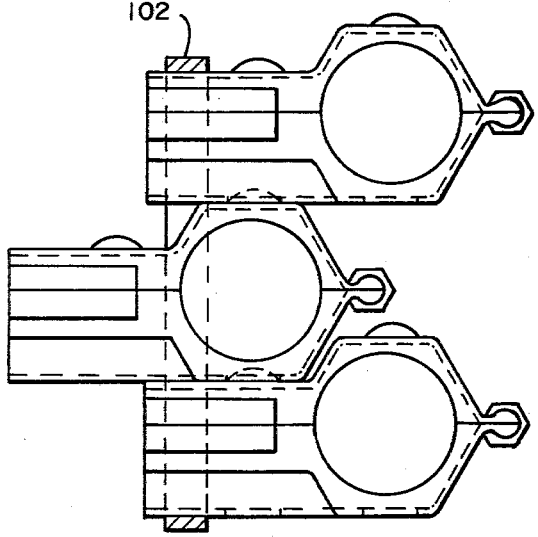
FIG.—10

SOLAR PANEL ASSEMBLY

The present invention relates generally to solar collection panels and more particularly to a specifically designed solar panel assembly.

There is no doubt a number of ways to design a solar collection panel to provide maximum efficiency and structural integrity, that is, assuming that cost is no object. For example, a solar panel could be made sufficiently thick and/or with sufficiently high quality material to resist hot spots or the tendency to warp or otherwise deform in shape. However, in reality cost is a factor and must be dealt with as a serious one. As will be seen hereinafter, the present invention provides a solar panel assembly which has been designed in an uncomplicated and economical way to provide both structural integrity and controlled thermal efficiency to minimize hot spots and overheating generally.

In view of the foregoing, one object of the present invention is to provide an uncomplicated and economical solar panel assembly.

Another object of the present invention is to provide a solar panel assembly having structural integrity and controlled efficiency to reduce hot spots and overheating generally.

Still another object of the present invention is to provide a panel assembly which is free to thermally expand and contract without fear of damaging any of its components.

Yet another object of the present invention is to provide a panel assembly which can be quickly and readily put together and taken apart.

Still another object of the present invention is to provide a panel assembly which vents moisture in an uncomplicated and reliable way.

Yet another object of the present invention is to provide a panel assembly which is designed for ease in shipping.

As will be described in detail hereinafter, the solar panel assembly designed in accordance with the present invention includes a solar panel arrangement having a main body defining internal passageways and means, preferably headers, for directing water into and out of the passageways. A corrugated glazing sheet is located on top of the panel body and a corrugated support sheet is located below the latter. In a preferred embodiment, an intermediate corrugated sheet different in cross sectional configuration than the lowermost support sheet is located between the latter and the underside of the panel body. This intermediate corrugated sheet not only aids in supporting the panel body, but also divides the space between the latter and the lowermost support sheet into separate sections. Moreover, in this preferred embodiment, all of these sheets and the panel itself are held together such that each is free to thermally expand and contract relative to the others.

The solar panel assembly just described may also include a header cover arrangement for enclosing each of the headers located on opposite ends of the panel body.

Each of these latter arrangements includes a rearward section which enclosed its associated header and a forward section which nests against the corrugated glazing sheet and lowermost support sheet. In addition, each arrangement is free to thermally expand and contract and each provides an uncomplicated method of supporting the glazing and lowermost support sheet insulating the headers and venting moisture.

FIG. 1 is a prospective view of an overall solar panel assembly constructed in accordance with the present invention.

FIG. 2 is a partially broken away prospective view of part of a solar panel arrangement constructed in accordance with the present invention and comprising part of the assembly illustrated in FIG. 1.

FIG. 3 is an enlarged sectional view of a part of the panel arrangement illustrated in FIG. 2 taken generally along line 3—3 in FIG. 2.

FIG. 4 is a front elevational view of a header cover arrangement constructed in accordance with the present invention and comprising part of the overall solar panel assembly illustrated in FIG. 1.

FIG. 5 is a top plan view of the arrangement illustrated in FIG. 4.

FIG. 6 is an underside plan view of the arrangement illustrated in FIG. 4.

FIG. 7 is a partially broken away perspective view of a portion of the arrangement of FIG. 4 in combination with a portion of the panel arrangement of FIG. 2.

FIG. 8 is a side elevational view of the arrangement illustrated in FIG. 7, taken generally along line 8—8 in FIG. 7.

FIG. 9 is a perspective view of a wire clip comprising part of the arrangement illustrated in FIGS. 7 and 8.

FIG. 10 is a side elevational view of a plurality of the assemblies illustrated in FIG. 1 packaged in a stack fashion.

Turning now to the drawings wherein like components are designated by like reference numerals throughout the various figures, attention is first directed to FIG. 1 which illustrates one end section of an overall solar panel assembly generally designated by the reference numeral 10. As will be seen hereinafter, panel assembly 10 includes a solar panel arrangement 12 provided for passing a continuous flow of water or other such heat collecting fluid through a plurality of passageways extending between an inlet header and an outlet header comprising part of this arrangement and a cover arrangement 14 for enclosing each of the headers. Only one of the cover arrangements is shown in FIG. 1 since only one end section of panel arrangement 12 is shown.

Turning now to FIGS. 2 and 3 in conjunction with FIG. 1, attention is directed to the various components making up panel arrangement 12. The main component in this arrangement is a solar panel 16 such as the one described in U.S. Pat. No. 4,098,331 or the like. As seen best in FIG. 1, this panel which is preferably constructed of a polyolefin plastic includes a sheet-like main body 18 defining a plurality of laterally spaced, longitudinal passageways 20 extending from one end 22 of the panel body to an opposite end (not shown). As seen best in FIG. 2, the panel also includes a tubular inlet header 24 which extends laterally along the entire lateral extent of panel end 22 from one lateral edge 26 of the panel to its opposite lateral edge 28 (FIG. 1). This inlet header is maintained in fluid communication with passageways 20, preferably in the manner described in the above recited patent and hence includes a chamber defining flange or skirt 29 for interconnecting the header and passageways as described in this patent. However, it is to be understood that panel 16 is not limited to this particular header design but may include any suitable header means for directing water or other such fluid into the passageways. Of course, a similar tubular header 24 and associated chamber defining flange 29 or such header means is provided along the opposite end of panel body 18 for directing water or other such fluid out of the passageway.

Panel arrangement 12 also includes a corrugated glazing sheet 30 located on the top side of panel body 18 and constructed of any suitable glazing material, preferably integrally formed transparent fiberglass reinforced polyester or polycarbonate plastic. Because of its corrugated configuration, sheet 30 includes alternating upstanding ridges 32 and depending channels 34 which extend lengthwise from one end 22 of panel body 18 to its other end and laterally from one side 26 of the panel body to its other side 28. Each of the lateral edges of glazing sheet 30, generally indicated at 36, defines a downwardly facing arcuate cross-section which is best seen in FIG. 3. In the preferred embodiment, these downwardly facing arcuate edges extend the entire length of panel body 18 and serve a particular function to be discussed hereinafter.

Glazing panel 30 is preferably designed so that its channels 34 extend entirely down to the topside of panel body 18. In this way the glazing sheet is self-supporting on the panel body and because of the relatively large number of support points it resists sagging. Moreover, the corrugations serve to improve the sheet's strength and, from an aesthetic standpoint, they serve to obscure or hide irregularities in shape which result during its manufacture.

Panel arrangement 12 also includes a lowermost, corrugated support sheet 38 which is preferably constructed of integrally formed fiberglass reinforced polyester resin and which is located below the underside of panel body 18 for supporting the latter on a deck or rack (not shown). As seen best in FIG. 2, sheet 38 includes alternating upstanding ridges 40 and depending channels 42 which extend lengthwise from one end 22 of panel body 18 to its other end (parallel with passageways 20) and laterally from one side 26 to the opposite side 28. In addition, this support sheet includes opposite lateral edges 44 which define upwardly facing arcuate cross-sections vertically aligned directly below the previously described lateral edges 36 of glazing sheet 30. Each of these lateral edges 44 extends the entire length of support sheet 38 in a preferred embodiment and, like edges 36, serve a particular purpose to be described hereinafter. One pair of vertically aligned lateral edges is best seen in FIG. 3.

In a preferred embodiment, panel arrangement 16 includes an intermediate corrugated support sheet 46 which may be constructed of the same material as sheet 38 and which is located between the underside of panel body 18 and the lowermost sheet. Because of its corrugated configuration, sheet 46 also includes alternating upstanding ridges and depending channels, generally indicated at 48 and 50 respectively. Moreover, these alternating ridges and channels extend parallel with the ridges and channels of support sheet 38 from one end of panel body 18 to its other end. However, intermediate support sheet 48 is slightly shorter laterally than sheet 38 so that its lateral edges 52 lie laterally inward of the lateral edges 44 of sheet 38, as best seen in FIG. 3. Moreover, the cross-sectional configuration of intermediate support sheet 46 is different from the cross-sectional configuration of lower most sheet 38 as best seen in FIG. 2. The innermost corrugated sheet is somewhat sinusoidal in configuration, that is its ridges and channels are somewhat rounded whereas the ridges and channels of the sheet 38 are somewhat flat along their tops and bottoms, respectively. Moreover, both of these configurations are different than the corrugated cross-sectional configuration of glazing sheet 30. However, it is to be understood that the present invention is not limited to these particular configurations so long as they provide the advantages previously described and to be discussed herein.

It should be apparent that the corrugated nature of the two support sheets just described serve to add structural integrity to these sheets. In addition however, the corrugated nature and corrugated design of lowermost sheet 38 also serves to provide air channels between itself and its supporting deck or rack and these air channels serve as insulation between the latter and the entire panel assembly. Moreover, the corrugated nature of the two support sheets combine to divide the space between the lowermost sheet and panel body 18 into separate lengthwise air channels which serve to provide limited thermal insulation and therefore controlled thermal efficiency for the overall assembly, thereby reducing the tendency for hot spots or over heating generally to build up in the panel as a result of stagnation in water flow therethrough. In other words, these air channels serve to control the overall thermal efficiency of the solar panel to reduce overheating during flow stagnation without losing too much heat during normal operation of the panel assembly. In an actual working embodiment in which the panel arrangement displays the configuration shown at typical operating condition where the water temperature is 100° F. and normal water flow occurs (1 gallon/minute) the panel arrangement will operate at efficiencies of 50-70%. On the other hand, if stagnation occurs, temperatures of the panel material will not exceed 200° F. This is a result of the limited insulation provided by the particularly designed air spaces defined by the two corrugated support sheets. Of course, the corrugated nature of the glazing sheet performs the same function as the support sheets.

As described thus far, panel arrangement 12 includes a solar panel 16, a top glazing sheet 30 and two bottom support sheets 38 and 46. These components are interconnected together by previously recited header cover arrangements 14. However, arrangement 12 also includes its own means for interconnecting these components, specifically two rods or tubes 54 and associated longitudinal clips 56. As seen best in FIG. 3, one of these tubes 54 is located between and against the inner confronting surfaces of an aligned pair of lateral edges 36 and 44 of sheets 30 and 38, respectively. This tube preferably extends the entire length of the adjacent lateral edges from one end of panel body 18 to its other end. The associated clip 56 also preferably extends the entire length of the aligned lateral edges and is somewhat c-shaped in cross-sectional configuration. From FIG. 3 it can be seen that this c-shaped clip fits around the outer surfaces of its associated lateral edges to clamp the two around tube 54. The other tube 54 and its associated clip interconnect the other aligned lateral edges 36 and 44 in the same manner.

From the foregoing, it should be apparent that the tubes 54 and associated c-shaped clips 56 in and by themselves hold panel 16, glazing sheet 30 and support sheets 38 and 46 together as shown in FIGS. 1 and 2. It should be equally apparent that these components are held together so that each is free to thermally expand and contract relative to the others. While the tubes and associated clips are preferred means to accomplish this, it is to be understood that other suitable means may be utilized. For example, the tube 54 does not have to be hollow and it does not have to be circular in cross-section. At the same time, the clips 56 do not have to be c-shaped in cross-section.

Having described solar panel arrangement 12, attention is now directed to FIGS. 4–9 for a detailed description of one of the header cover arrangements 14. As will be seen below, each of these arrangements is provided for covering one of the header tubes 24 and its associated flange 28 as well as an adjoining end section of panel body 18 (including an end 22) and adjacent end section of sheets 30, 38 and 46. In this regard, these various sheets were previously described as extending from one end 22 of panel body to its opposite end. However, in actual practice, the sheets may not extend entirely to these ends but only approximately thereto as best seen in FIG. 2. Recognizing and dealing with this by covering the ends of the sheets with arrangements 14 eliminates the necessity to maintain close tolerances between the length of panel body 18 and the length of each of the sheets.

Each arrangement 14 includes a top cover 60 and, as will be seen hereafter, a bottom cover 62, each of which is integrally formed of suitable material, preferably ABS plastic. As seen best in FIGS. 7 and 8 in conjunction with FIGS. 4 and 5, top cover 60 includes a rearward section 64 which defines a somewhat downwardly facing arcuate cross-section provided for covering the top side of header tube 24 and its associated flange 28. Rearward section 64 extends laterally the entire width of panel body 18 as seen in FIG. 4 and includes a rearwardly extending flange 66 which is somewhat semi-cylindrical in cross-section (FIG. 8) and which is provided for reasons to be discussed hereinafter.

Top cover 60 also includes a forward section 68 in the form of a corrugated sheet which is substantially shorter in length but approximately the same width as corrugated glazing sheet 30. As best seen in FIGS. 4 and 7, the lateral cross-sectional configuration of forward section 68 is substantially identical to the lateral cross-sectional configuration of glazing sheet 30 and hence includes corresponding alternating ridges and channels indicated at 70 and 72, respectively. In addition, forward section 68 includes opposite lateral edges 74 substantially identical to previously described c-shaped clip 56. From FIGS. 4 and 7, it can be seen that ridges 70 and channels 72 nest within corresponding ridges 32 and channels 34 of glazing sheet 30 while each lateral edge 74 nests over a corresponding lateral edge 36 with a top portion of previously described clip 56 therebetween. In this regard, the lateral configuration of forward section 68 is only substantially identical to the lateral section of glazing sheet since the former must be slightly larger to nest within the latter and since the lateral edges 74 actually nest over the clamps 56 and not the lateral edges 36.

Having described top cover 60, at least in part, attention is now directed to bottom cover 62. The bottom cover also includes a rearward section generally indicated at 76 which conforms in length and width to top rearward section 64 and which defines an upwardly directed arcuate cross-section for covering the underside of header 24 and its associated skirt 28, as best seen in FIG. 8. In addition, rearward section 76 includes a rearward semi-cylindrical flange 78 corresponding in length to previously described flange 66 and located directly under the latter.

Bottom cover 62 also includes a forward section 80 which corresponds in length and width to top forward section 68 and which also forms a corrugated sheet. As seen best in FIGS. 4 and 7, the lateral cross-sectional configuration of forward section 80 is substantially identical to the lateral cross-sectional configuration of lowermost support sheet 38. Accordingly, forward section 80 includes alternating ridges 82 and channels 84 which nest into ridges 40 and channels 42 in lowermost sheet 38 and lateral edges 86 which nest against lateral edges 44 of sheet 38 with a bottom longitudinal section of clip 56 therebetween, as best seen in FIG. 7.

In a preferred embodiment, the two covers just described are interconnected in two ways. First, an elongated clip 88 similar to but preferably identical to previously described clips 56, that is one having a somewhat c-shaped cross-section, is snapped around the adjoining flanges 66 and 78 comprising part of rearward sections 64 and 76. In addition, two wire clips 90, one of which is shown by itself in FIG. 9, are used to clamp together the vertically aligned lateral edges 74 and 86. As seen in FIG. 9, this clip is somewhat rectangular in configuration having unconnected U-shaped ends 92 and 94 which lie in normal planes so as to be readily engageable with and disengageable from one another. As seen best in FIGS. 7 and 8, each of these wire clips is located around inwardly necked portions of an associated pair of lateral edges 74 and 86 and the two U-shaped ends 92 and 94 are interlocked with one another. In order to do this however it is necessary to provide a continuous throughway 96 through glazing sheet 30 and lowermost support sheet 38 since both extend laterally beyond the wire clip. This passageway also passes through panel body 18 if the panel body extends that far laterally and also intermediate support sheet 46, although in the embodiment shown, this latter sheet does not extend beyond the wire clip laterally. The clip holds the glazing sheet in place and the slot is sufficiently large to compensate for contraction and expansion of the sheets.

As stated previously, the various components making up the panel arrangement 12 are interconnected to compensate for thermal expansion and contraction. It should be apparent from the foregoing that the same is true with regard to the various components making up the header arrangements 14 relative to one another and relative to the components making up the panel arrangement 12. In this regard, each of the previously described throughways 96 provided for passing one side of wire clip 90 is preferably sufficiently wide for taking into account thermal expansion and contraction of the various sheets and the panel body making up panel arrangement 12 and the overall length of each wire clip is sufficiently long to compensate for thermal expansion and contraction of its associated lateral edges.

In addition to the foregoing, top cover 60 includes a plurality of raised dimples or projections 98 located in both its rearward section and its corrugated front section. In addition, bottom cover 62 incudes an equal plurality of throughholes 100 respectively vertically aligned under dimples 98. The through-holes 100 by themselves serve one purpose and together with the dimples 98 they serve a second purpose. First, the through-holes serve to vent moisture which enters between the top side of glazing sheet 30 and the underside of forward section 68 which most likely will occur when the overall panel assembly is supported at an incline. In this latter case, water will generally run down the top face of the overall assembly and enter the lowermost arrangement 14 where it might accumulate but for openings 100. Air flow through the top and bottom vent will further serve to vent moisture.

In addition to acting as moisture vents, holes 20 cooperate with dimples 98 in stacking the overall panel assemblies as illustrated in FIG. 10. As can be seen there, adjacent ends of the stacked panel assemblies are staggered lengthwise relative to one another so that a forward dimple of one top cover enters a rearward through-hole on the bottom cover directly above it. The rearward dimple on the top cover directly over this latter bottom cover enters a forward through-hole in the bottom cover directly above it, and so on. Each end of this stack may be fixedly held together by means of a strap 102 for storage and shipping.

What is claimed is:

1. A solar panel assembly comprising:
   a solar panel including a main body defining internal passageways and means for directing water into and out of said passageways;
   a corrugated glazing sheet located on the top side of said panel body and having alternating ridges and channels of a particular cross-sectional configuration;
   a lowermost corrugated sheet located below the underside of said panel body for supporting the latter on a deck, said sheet having alternating ridges and channels of a particular cross-sectional configuration;
   an intermediate corrugated sheet located between the underside of said panel body and said lowermost sheet to aid the latter in supporting said panel body and for dividing the space therebetween into separate sections, said intermediate sheet having alternating ridges and channels extending in the same direction as the ridges and channels of said lowermost sheet but having a particular cross-sectional configuration different than the latter; and
   means for holding said top glazing sheet and said bottom supporting sheets on opposite sides of said panel body, respectively.

2. An assembly according to claim 1 wherein both said glazing sheet and said lowermost sheet extend beyond opposite lateral sides of said panel body to form a pair of vertically aligned lateral edges on each side of said panel body and wherein said holding means includes means for clamping each of said pair of lateral edges together.

3. An assembly according to claim 2 wherein each of the lateral edges of said glazing sheet defines a downwardly facing arcuate cross-section and each of the lateral edges of said lowermost sheet defines an upwardly facing arcuate cross-section and wherein said holding means includes a tube extending between each pair of aligned edges and said clamping means, said clamping means including at least one clip extending partially around each of said pairs of lateral edges.

4. An assembly according to claim 3 wherein said panel, top glazing sheet, bottom support sheets and holding means are held together such that each is free to thermally expand and contract relative to the others.

5. An assembly according to claim 1 wherein said water directing means includes a pair of header means on opposite sides of said panel body, said assembly including an arrangement for enclosing each of said header means.

6. An assembly according to claim 5 wherein each of said enclosing arrangements includes:
   a top cover having a rearward section covering the top side of its associated header means and a forward section in the form of a corrugated sheet shorter in length than said glazing sheet but having substantially the same cross-sectional configuration laterally as said glazing sheet including substantially identical alternating ridges and channels, said forward section being nested on top of an end section of said glazing sheet adjacent said associated header; and
   a bottom cover having a rearward section covering the bottom side of said associated header means and a forward section in the form of a corrugated sheet shorter in length than said lowermost support sheet but having substantially the same cross-sectional configuration laterally as said lowermost sheet including substantially identical alternating ridges and channels, said bottom forward section being rested against the bottom of an end section of said lowermost sheet adjacent said associated header.

7. An assembly according to claim 6 wherein said top forward section and said bottom forward section extend beyond opposite lateral sides of said panel body to form a pair of vertically aligned lateral edges on each side of said panel body, each of the top lateral edges of said top forward section defining a downwardly directed arcuate cross-section and each of said bottom lateral edges of said bottom forward section defining an upwardly directed arcuate section, each of said enclosing arrangements including clip means for connecting together each of said pairs of aligned lateral edges.

8. An assembly according to claim 6 wherein said top cover includes a plurality of raised dimples on its rearward and forward sections and wherein said bottom cover includes a plurality of through-holes extending through its rearward and forward sections, said through-holes being vertically aligned below said dimples and shaped to receive the latter.

9. A solar panel assembly comprising:
   a solar panel including a main body defining internal passageways and a pair of header means for directing water into and out of said passageways;
   a corrugated glazing sheet located on the top side of said panel body and having alternating ridges and channels of a particular cross-sectional configuration; a lowermost corrugated sheet located below the underside of said panel body for supporting the latter on a deck, said sheet having alternating ridges and channels of a particular cross-sectional configuration;
   an arrangement for enclosing each of said header means, said arrangement including a top cover having a rearward section covering the top side of its associated header means and a forward section in the form of a corrugated sheet shorter in length than said glazing sheet but having substantially the same cross-sectional configuration laterally as said glazing sheet including substantially identical alternating ridges and channels, said forward section being nested on top of an end section of said glazing sheet adjacent said associated header and a bottom cover having a rearward section covering the bottom side of said associated header means and a forward section in the form of a corrugated sheet shorter in length than said lowermost support sheet but having substantially the same cross-sectional configuration laterally as said lowermost sheet including substantially identical alternating ridges and channels, said bottom forward section being nested against the bottom of an end section of said lowermost sheet adjacent said associated header; and means for connecting said panel, glazing and support sheets and each header means enclosing arrangement.

10. An assembly according to claim 9 wherein said panel, top glazing sheet, bottom support sheets and arrangements are held together such that each is free to thermally expand and contract relative to the others.

11. A solar heat panel assembly comprising:
   a solar panel including a main body defining a plurality of spaced internal water passageways extending from one end of said body to an opposite end thereof and a pair of header means respectively connected with and extending the length of said ends for directing water into and out of said passageways,
   a corrugated glazing sheet located on the top side of said panel body and having alternating ridges and channels extending in the direction of said passageways, said glazing sheet extending lengthwise from one end of said panel boty to its other end and laterally from one side thereof to an opposite side, said sheet including opposite lateral edges defining downwardly facing arcuate cross-sections;
   a lowermost corrugated sheet located below the underside of said panel body for supporting the latter on a deck and having alternating ridges and channels parallel with said passageways, said sheet extending lengthwise from one end of said panel body to its other end and laterally from one side thereof to an opposite side, said support sheet including opposite lateral edges defining upwardly facing arcuate cross-sections vertically aligned directly below the opposite lateral edges of said glazing sheet;
   an intermediate corrugated sheet located between the underside of said panel body and said lowermost sheet to aid the latter in supporting said panel body and for dividing the space therebetween into separate lengthwise sections, said intermediate sheet having alternating ridges and channels extending parallel with but differing in cross-sectional configuration than the ridges and channels of said lowermost sheet; and means for attaching said vertically aligned lateral edges of said glazing and lowermost sheets on each side of said panel body, each of said attaching means including a cylindrical tube extending between a corresponding pair of aligned edges and at least one clip extending partially around the latter.

12. An assembly according to claim 11 including a header cover arrangement for each of said header means, each of said cover arrangements including:
   a top cover having a rearward section covering the top side of its associated header means and a forward section in the form of a corrugated sheet shorter in length than said glazing sheet but having substantially the same cross-sectional configuration laterally as said glazing sheet including substantially identical alternating ridges and channels and opposite lateral edges, said forward section being nested on top of an end section of said glazing sheet adjacent said associated header;
   a bottom cover having a rearward section covering the bottom side of said associated header means and a forward section in the form of a corrugated sheet shorter in length than said lowermost support sheet but having substantially the same cross-sectional configuration laterally as said lowermost sheet including substantially identical alternating ridges and channels and opposite lateral edges, said bottom forward section being nested against the bottom of an end section of said lowermost sheet adjacent said associated header such that its opposite lateral edges are vertically aligned below the opposite lateral edges of said top forward section; and
   clip means for attaching together each of said last mentioned pairs of lateral edges.

13. An assembly according to claim 12 wherein said top cover includes a plurality of raised dimples on its rearward and forward sections and wherein said bottom cover includes a plurality of through-holes extending through its rearward and forward sections, said through-holes being vertically aligned below said dimples and shaped to receive the latter.

14. An assembly according to claim 13 wherein said top and bottom rearward sections include mating lateral edges, said assembly including clip means for connecting said edges together.

15. An assembly, according to claim 14, wherein all of said components comprising said assembly are held together such that each is free to thermally expand and contract relative to the others.

* * * * *